United States Patent [19]

Scott

[11] 4,359,378

[45] Nov. 16, 1982

[54] CATALYTIC CRACKING PROCESS FOR IMPROVED OCTANE

[75] Inventor: John W. Scott, Ross, Calif.

[73] Assignee: Chevron Research Company, San Francisco, Calif.

[21] Appl. No.: 121,934

[22] Filed: Feb. 15, 1980

Related U.S. Application Data

[63] Continuation-in-part of Ser. No. 30,484, Apr. 16, 1979, abandoned.

[51] Int. Cl.$^3$ .............................................. C10G 11/05
[52] U.S. Cl. ................................... 208/120; 208/119; 252/454; 252/460
[58] Field of Search ............................... 208/120–121, 208/DIG. 1, 119; 585/407, 419

[56] References Cited

U.S. PATENT DOCUMENTS

| | | | |
|---|---|---|---|
| 3,364,136 | 1/1963 | Chen et al. | 208/120 |
| 3,554,900 | 1/1971 | Bowes | 208/111 |
| 3,756,942 | 9/1973 | Cattanach | 208/137 |
| 3,775,501 | 11/1973 | Kaeding et al. | 208/138 |
| 3,788,977 | 1/1974 | Dolbear et al. | 208/120 |
| 3,827,968 | 8/1974 | Givens et al. | 585/322 |
| 3,835,032 | 9/1974 | Dolbear et al. | 208/120 |
| 3,894,934 | 9/1975 | Owen et al. | 208/78 |
| 3,929,621 | 12/1975 | Luissier et al. | 208/120 |
| 3,953,366 | 4/1976 | Morrison | 252/455 Z |
| 4,072,600 | 2/1978 | Schwartz | 208/120 |
| 4,164,465 | 8/1979 | Gladrow | 208/120 |
| 4,238,318 | 12/1980 | Kouwenhoven et al. | 208/120 |
| 4,239,654 | 12/1980 | Gladrow et al. | 208/120 X |
| 4,242,237 | 12/1980 | Gladrow et al. | 208/120 X |
| 4,291,188 | 9/1981 | Wagstaff | 208/120 X |

*Primary Examiner*—Delbert E. Gantz
*Assistant Examiner*—G. E. Schmitkons
*Attorney, Agent, or Firm*—D. A. Newell; W. D. Reese; S. H. Roth

[57] ABSTRACT

A process is disclosed for converting hydrocarbons with a particulate catalyst containing a crystalline solid which has pore openings and maximum cage dimensions of 5.5–7.0 Angstroms; an active metal with both dehydrogenation activity and oxidation activity is disposed within the interior of crystals of the crystalline solid; the catalyst is cycled between a reactor and a regenerator, and the active metal is used for (1) selectively dehydrogenating paraffins and aromatizing aliphatics in the reaction zone while large-diameter coke-forming hydrocarbons are inhibited from contacting the metal, (2) facilitating catalyst regeneration by accelerating combustion of carbon from within the pores of the crystalline solid in the regenerator, so as to assure very low residual carbon levels within the crystalline solid in regenerated catalyst; and (3) oxidizing carbon monoxide in the regenerator to make available additional heat to compensate for endothermic conversion reactions in the cracking reactor.

14 Claims, No Drawings

CATALYTIC CRACKING PROCESS FOR IMPROVED OCTANE

CROSS-REFERENCE TO RELATED APPLICATIONS

This application is a continuation-in-part of my co-pending application Ser. No. 30,484, filed on Apr. 16, 1979 (now abandoned).

BACKGROUND OF THE INVENTION

The present invention relates to a process for converting hydrocarbons. More particularly, the invention relates to a catalytic hydrocarbon conversion process which provides a product rich in olefins and aromatics and also enhances combustion of coke and carbon monoxide during regeneration of the catalyst. In one aspect, the invention concerns a process for catalytic cracking of hydrocarbons using a catalyst which forms a product of increased octane and facilitates regeneration.

Catalytic cracking systems employ catalyst in a moving bed or a fluidized bed. Catalytic cracking is carried out in the absence of externally supplied molecular hydrogen, and is, for that reason, distinctly different from hydrocracking, in which molecular hydrogen is added in processing. In catalytic cracking, an inventory of particulate catalyst is continuously cycled between a cracking reactor and a catalyst regenerator. In a fluidized catalytic cracking (FCC) system, hydrocarbon feed is contacted with catalyst particles in a hydrocarbon cracking zone, or reactor, at a temperature of about 425°–600° C., usually 460° C.–560° C. The reactions of hydrocarbons at the elevated operating temperature result in deposition of carbonaceous coke on the catalyst particles. The resulting fluid products are separated from the coke-deactivated, spent catalyst and are withdrawn from the reactor. The coked catalyst particles are stripped of volatiles, usually by means of steam, and passed to the catalyst regeneration zone. In the catalyst regenerator the coked catalyst is contacted with a predetermined amount of molecular oxygen. A desired portion of the coke is burned off the catalyst, restoring catalyst activity and simultaneously heating the catalyst to, e.g. 540°–815° C., usually 590°–730° C. Flue gas formed by combustion of coke in the catalyst regenerator may be treated for removal of particulates and conversion of carbon monoxide, after which it is normally discharged into the atmosphere.

The extent of conversion obtained in a cracking operation may be defined as the volume percent of feed hydrocarbons having a normal boiling point of at least 221° C. which is changed to hydrocarbon products having normal boiling points below 221° C. during the conversion step. Conversion is often used as a measure of the severity of a commercial cracking operation. At a given set of operating conditions, a more active catalyst gives a greater conversion than does a less active catalyst. High conversion allows flexible operation of an FCC unit. For example, when conversion is raised, feed throughput can be increased, or a higher degree of feed conversion can be maintained with a constant throughput rate.

The selectivity with which the feed is converted to desired hydrocarbon products is also important. The primary desired product is naphtha-boiling-range hydrocarbons, i.e., products which have a normal boiling point roughly between 24° C. and 220° C. Other possible conversion products are usually not as valuable as naphtha. For example, feed conversion may yield coke, hydrogen and such normally uneconomical by-products as the light paraffins, methane, ethane and propane. While formation of some coke is needed to provide process heat, excessive coke formation at the expense of naphtha is undesirable. In contrast to light paraffins, the light olefins may be economically attractive products. $C_3$ and $C_4$ olefins can be utilized as feeds for other hydrocarbon conversion processes, such as isoparaffin alkylation to form high-octane gasoline components, or as feeds for petrochemical-type operations such as polymerization.

The recent impetus for eliminating octane-improving additives such as lead and manganese from commercial gasoline has increased the importance of improving the clear octane of the various components which make up the gasoline pool. Catalytically cracked naphtha is an important source of gasoline in the United States, but is often among the lower-octane components employed in the unleaded gasoline pool. FCC-derived naphtha may be upgraded by any of several conventional refining operations such as reforming, but the added expense of further refining can be avoided if octane ratings of FCC naphtha can be raised to an acceptable level by modifying the catalytic cracking operation itself. Increasing the octane rating of catalytically cracked naphtha can be accomplished, according to the present invention, by increasing its aromatics content, its olefins content, or both. In addition, the process of this invention can increase potential gasoline pool octane by providing additional light olefins for alkylation.

Several patents have suggested modification of cracking catalysts to increase the octane rating of FCC naphtha. The modifications usually involve adding to the catalyst particles a metal having a moderate dehydrogenation activity. For example, U.S. Pat. No. 3,835,032 suggests the use of silver-exchanged or copper-exchanged Type Y zeolite component in a cracking catalyst to increase the aromatic content of the naphtha product. U.S. Pat. No. 3,929,621 suggests the use of copper-exchanged Y zeolite as a catalyst component in order to increase aromatics and olefins in the cracked naphtha. U.S. Pat. No. 3,994,800 suggests using a modified Type Y zeolite to raise the olefins content of catalytically cracked naphtha. U.S. Pat. No. 3,788,977 suggests addition of uranium or platinum on an alumina support either in cracking catalyst particles or in separate particles introduced into circulation in the particulate solids inventory in a cracking system to increase the dehydrogenation and cyclization reactions taking place in the cracking reactor.

Metals which have a substantial dehydrogenation activity generally also have a substantial activity for oxidation catalysis. The desire to promote efficient combustion of carbon monoxide during regeneration of cracking catalyst has also led to the use of highly active metals in cracking catalysts. Some commercial cracking systems regenerate catalyst in an incomplete carbon monoxide combustion mode, in which a substantial amount of carbon typically remains on the catalyst after regeneration, e.g., more than 0.2 weight percent, usually about 0.25 to 0.45 weight percent residual carbon. The flue gas removed from cracking catalyst regenerators operating in an incomplete combustion mode is characterized by relatively low carbon dioxide/carbon monoxide volume ratio. The amount of oxygen introduced into a catalyst regenerator operating in an incomplete combustion mode must usually be carefully limited in order to prevent afterburning, or combustion of carbon monoxide in the flue gas downstream of the dense bed of catalyst, with consequent overheating of the flue gas.

Most fluidized catalytic cracking systems now use zeolite-containing catalysts, which have high activity and selectivity, particularly when the concentration of coke on the catalyst is relatively low. It is therefore desirable to regenerate zeolite-containing catalysts to as low a coke level as possible to obtain high activity and selectivity. It is also desirable to burn carbon monoxide as completely as possible during catalyst regeneration to obtain additional heat, especially when the concentration of coke on spent catalyst is low as a result of high catalyst selectivity. Among the ways to help reduce the amount of coke on regenerated catalyst and burn carbon monoxide for process heat is carbon monoxide combustion in a dense-phase catalyst bed in the regenerator catalyzed by an active, combustion-promoting metal. Metals have been used either as an integral component of the cracking catalyst particles or as a component of a separate particulate additive, in which the active metal is associated with a support other than the catalyst. Additive particles are mixed with catalyst particles in the circulating particulate solids inventory. Various ways of employing carbon monoxide combustion-promoting metals in cracking systems have been suggested. In U.S. Pat. No. 2,647,860, it is proposed to add 0.1-1 weight percent chromic oxide to a cracking catalyst to promote combustion of carbon monoxide to carbon dioxide and to prevent afterburning. In U.S. Pat. No. 3,808,121, it is proposed to introduce relatively large-size particles containing a carbon monoxide combustion-promoting metal into a cracking catalyst regenerator. The circulating particulate solids inventory, comprised of relatively small-size catalyst particles, is cycled between the cracking reactor and the catalyst regenerator, while the combustion-promoting particles remain in the regenerator because of their size. Oxidation-promoting metals such as cobalt, copper, nickel, manganese, copper-chromite, etc., impregnated on an inorganic oxide such as alumina are disclosed. Belgian Patent Publication 820,181 (Equivalent to U.S. Pat. No. 4,072,600) suggests using catalyst particles containing platinum, palladium, iridium, rhodium, osmium, ruthenium or rhenium to promote carbon monoxide oxidation in a catalyst regenerator. An amount of the metal between a trace and 100 ppm is added to the catalyst particles, either during catalyst manufacture or during the cracking operation, as by addition of a compound of the combustion-promoting metal to the hydrocarbon feed. Addition of the promoter metal to the cracking system is said to decrease product selectivity by substantially increasing coke and hydrogen formation. Catalyst particles containing the promoter metal can be used alone or circulated in physical mixture with catalyst particles free of the combustion-promoting metal. U.S. Pat. Nos. 4,072,600 and 4,093,535 disclose the use of combustion-promoting metals in cracking catalysts in concentrations of 0.01 to 50 ppm, based on total catalyst inventory.

It is recognized in the cracking art that metals which actively catalyze dehydrogenation and oxidation reactions can have serious drawbacks when used in cracking catalysts. The presence of such metals in a cracking catalyst can enhance formation of coke, hydrogen and light paraffin gases such as methane, as observed, for example, when processing hydrocarbon feeds which are high in nickel. The art has suggested several ways to obtain benefits from using active metals in a cracking catalyst without suffering a loss in product selectivity. In one approach, all hydrocarbons are prevented from contacting the catalytic metal. Only the oxidation activity of the metal is utilized, since the metal is retained in the catalyst regenerator (e.g., U.S. Pat. No. 3,808,121) or is included within the crystals of a zeolitic crystalline aluminosilicate which has pore openings no larger than 5 Angstroms and small size (3-5 Angstrom) cages, so that essentially no feed or cracked hydrocarbons can contact the metal while it is in the reactor (e.g., U.S. Pat. No. 3,364,136). In another approach, the catalytic metal is employed in a concentration sufficiently low that the selectivity loss due to the presence of the metal is offset by the increased heat available from catalyzed carbon monoxide combustion and increased zeolite selectivity from a low residual coke level.

There have been attempts to derive the benefit of either the octane-increasing, dehydrogenation-aromatization activity of active metals, on one hand, or the carbon monoxide combustion, oxidation activity of active metals, but these two distinct activities have not been completely successfully combined in a single cracking catalyst, because metals with substantial carbon monoxide oxidation activity tend to increase coke, hydrogen and light paraffin gases instead of valuable aromatics and olefins. The present invention allows the benefits of both the dehydrogenation-aromatization activity and the oxidation activity of an active metal to be obtained simultaneously in catalytic cracking.

The use of crystalline aluminosilicate zeolites having uniform pore openings in the range from 5.5–7.0 Angstroms and maximum cage dimensions of 5.5–7.0 Angstroms for catalytic cracking is known. For example, U.S. Pat. Nos. 3,758,403, 3,849,291 and 3,856,659 all suggest the use of the zeolite ZSM-5 in a dual-zeolite catalyst, along with a conventional crystalline aluminosilicate having larger pore openings and cages, such as a Y-type zeolite. U.S. Pat. No. 3,894,934 suggests the use of a carbon monoxide combustion-promoting component in conjunction with ZSM-5 and a large-pore-size crystalline aluminosilicate. The use of ZSM-5 containing active catalytic metal values to catalyze aromatics alkylation is suggested in U.S. Pat. No. 3,953,366. ZSM-5-containing catalysts are also discussed in U.S. Pat. Nos. 3,702,886 and 3,926,782. Crystalline silicates are described in U.S. Pat. Nos. 4,061,724 and 4,073,865.

SUMMARY OF THE INVENTION

The present invention concerns a process for converting feed hydrocarbons having normal boiling points above 220° C., comprising:

(a) cycling between a reaction zone and catalyst regeneration zone a particulate solid catalyst comprising a crystalline solid selected from a zeolitic crystalline aluminosilicate and a crystalline silicate, and from 0.01 to 1,000 parts per million, by weight based on the catalyst, of an active metal or compound of an active metal selected from platinum, palladium, iridium, rhodium, osmium, ruthenium and copper, calculated as the element, disposed within the interior of crystals of the crystalline solid, the crystal structure of the crystalline solid defining substantially uniform pore openings with maximum diameters of from 5.5 to 7.0 Angstrom units and substantially uniform cages with maximum cage dimensions of from 5.5 to 7.0 Angstrom units, whereby contact between the feed hydrocarbons and the active metal is restricted; (b) forming cracked hydrocarbons having normal boiling points below 220° C. and depositing coke on the particulate solids by contacting the feed hydrocarbons with the catalyst in the reaction zone at cracking conditions including the absence of added molecular hydrogen, and forming olefins and aromatics by dehydrogenating and aromatizing aliphatic components of the feed hydrocarbons and the cracked hydrocarbons in the reaction zone in contact with the active metal disposed within the crystalline solid; and (c) forming carbon monoxide in the regeneration zone by burning coke from the catalyst with molecular oxygen at catalyst regeneration conditions, and burning carbon monoxide with molecular oxygen in contact with the active metal disposed within the crystalline solid.

The increase in product octane that can be obtained through the dehydrogenation activity of platinum and other catalytically active metals with high dehydrogenation activity can be synergistically combined with the improved catalyst regeneration available through the oxidation activity of the same metals for burning carbon monoxide and coke during cracking catalyst regeneration. This is accomplished by including the active metal within the interior of crystals of a crystalline solid having uniform pore openings and cages, with dimensions in the range of 5.5–7.0 Angstroms. This restricts contact between hydrocarbons and the active metal, favoring contact between the metal and hydrocarbons of relatively small molecular diameter, so that aliphatic hydrocarbons preferentially contact the active metal. Low-octane hydrocarbons are thereby catalytically aromatized to form higher-octane aromatics. Large-diameter, coke-forming hydrocarbons are preferentially excluded from contact with the active metal, so that coke and hydrogen formation are limited. The over-all octane rating of naphtha produced in the cracking process is accordingly improved. Formation of valuable $C_2$–$C_4$ olefin by-products is favored, relative to low-value $C_2$–$C_4$ paraffins. In addition, the pore openings and cages in the crystalline solid are sufficiently large to permit the active metal to be accessible to carbon monoxide and oxygen during catalyst regeneration, so that the combustion-promoting activity of the active metal can be utilized for promoting carbon monoxide and coke burning in the catalyst regenerator.

DETAILED DESCRIPTION OF THE INVENTION

The present invention is used in a system for catalytic cracking of hydrocarbon feeds. Conventional catalytic cracking feeds typically include a mixture of aliphatic and aromatic hydrocarbons boiling at 221° C. and higher. The same hydrocarbon cracking feeds normally processed in commercial catalytic cracking systems may be processed in a cracking system employing the present invention. Suitable feedstocks include, for example, petroleum distillates or residuals, either virgin or partially refined, e.g. by catalytic hydroprocessing. Thus, conventional gas oil cuts are suitable, as are atmospheric and vacuum residua. So-called synthetic feeds, such as coal oils, bitumen and shale oils, are also suitable. A suitable feed may include recycled hydrocarbons which have already been subjected to cracking, for example light, medium and heavy cycle oils.

Suitable feeds may have been previously treated or refined to remove sulfur, nitrogen or metals, as by catalytic treatment in the presence of hydrogen. It is particularly preferred to utilize feeds which have low nitrogen concentrations, so that hydrodenitrified feeds are considered particularly suitable.

Conversion, or cracking, conditions employed in the hydrocarbon converson step of the invention may be obtained in part by pre-heating or heat-exchanging the hydrocarbon feed to bring it to a temperature of about 315°–400° C. before introducing it into the cracking zone, but preheating of the feed is not essential. Cracking, conversion conditions include a temperature of about 425° C. to about 600° C., preferably 460° C. to 560° C. Cracking conditions also include a pressure in the range from about atmospheric to about 4 atmospheres or more, preferably about 2 atmospheres to about 3 atmospheres. In fluidized catalyst systems, a catalyst/hydrocarbon weight ratio of about 3 to about 10 is usually suitable. A hydrocarbon weight hourly space velocity in the cracking zone of about 5–250 per hour is preferably used. The average amount of coke contained in the so-called "spent" catalyst after contact with the hydrocarbons in the cracking zone, when the catalyst is passed to the regenerator, is preferably between about 0.5 weight percent and about 2.5 weight percent. The exact coke concentration on spent catalyst will depend partly on the desired carbon content of regenerated catalyst in the particular system, as well as on the heat balance of the particular system. The cracking, or reaction, zone may be of conventional design and may use dilute-phase fluidized catalyst contact, riser-type entrained catalyst contact, dense-bed fluidized catalyst contact, countercurrent contact, or a combination thereof, between the feed hydrocarbons and the catalyst. Catalyst fluidization and entrainment may be assisted by use of gases such as steam or nitrogen.

The catalyst regeneration zone used in an embodiment of the present invention may also be of conventional design suitable for use in regenerating cracking catalyst. The gaseous atmosphere within the conventional cracking catalyst regeneration zone normally includes a mixture of gases in concentrations which vary according to the locus within the regenerator. The concentrations of gases also vary according to the coke concentration on the spent catalyst particles entering the regenerator and according to the amount of molecular oxygen and steam introduced into the regenerator. Generally, the gaseous atmosphere in the regenerator contains 5–25% steam, varying amounts of oxygen, carbon monoxide, carbon dioxide and nitrogen. A temperature in the regeneration zone of about 538° C. to about 815° C. is generally suitable, and a temperature of about 600° C. to about 700° C. is preferred. Regeneration is preferably carried out in a dense-phase fluidized bed of catalyst, with "dense-phase" being defined as a density of at least 160 kg/m$^3$.

An essential feature of the present invention is the use of a crystalline solid with uniform-size pore openings, or apertures, having maximum diameters in the range from 5.5–7.0 Angstrom units. The crystalline solid is preferably a zeolitic crystalline aluminosilicate or a crystalline silicate. Such crystalline solids are usually referred to as having "intermediate"-size pore openings. The zeolitic crystalline aluminosilicates include aluminum and silicon atoms, each of which is associated with four oxygen atoms, which may be shared with other aluminum and silicon atoms to form larger crystalline structures. The four oxygen atoms define a tetrahedron around an aluminum or silicon atom, with the aluminum and silicon atoms being at the centers of tetrahedra. Crystalline silicates suitable for use are made up of tetrahedra, similar to zeolitic aluminosilicates, except that aluminum atoms are essentially absent from the crystal structure. The tetrahedra of these crystalline solids combine to form crystals with a structure of uniform pores, openings and cages or channels which are of molecular dimensions. Crystalline silicates typically have no cationic ion-exchange properties, whereas the zeolitic aluminosilicates usually do, because of the electrical imbalance caused by association of aluminum atoms with four oxygen atoms. The pore openings, or apertures, of crystalline aluminosilicates and crystalline silicates are conventionally described as being defined by "sides" of a certain number of tetrahedra. Crystalline materials with pore openings in the intermediate range are usually characterized as having ten-sided apertures, in contrast to small-pore zeolites, such as Zeolite A, which usually have eight-sided apertures, and to large-pore zeolites, such as Zeolites X and Y, which usually have twelve-sided apertures. Intermediate-size pore openings of 5.5–7.0 Angstrom units are large enough to permit paraffins and like relatively small-diameter molecules to enter relatively easily the cages in the crystalline solids, but are small enough to inhibit entry of large effective-diameter molecules, such as dicyclics, into the cages of the crystals. It is also an essential feature of the present invention that suitable crystalline solids have substantially uniform cages of "intermediate" maximum diameter, i.e. from 5.5–7.0 Angstrom units. In some cases, the crystal structure defines long channels, rather than cages. In this case, the critical maximum dimension is that of the maximum diameter of the cross-sections of the channels. The 5.5 to 7.0-Angstrom-diameter cages of suitable crystalline solids permit the dehydrogenation of paraffins to occur, but impede formation of large coke-forming molecules within the intermediate-size cages. This may be contrasted to the reactions which can take place in larger-size cages present in crystalline aluminosilicates used conventionally in cracking catalysts such as hydrogen-form or rare earth-form Zeolite Y.

Suitable crystalline solids include, for example, crystalline solids having the characteristic crystal structures of Zeolite ZSM-5, small-pore mordenite, Zeolite NU-1, the crystalline silicate termed "Silicalite", and the like. Such crystalline solids may be used as synthesized or may be modified by known techniques such as ion exchange, acid leaching and the like to vary their porosity, acid strength and total acidity, their catalytic hydrogen exchange and hydrogen transfer characteristics, and the ratio of their key atomic constituents. The products obtained in the present process will vary depending on the characteristics of the particular crystalline solid employed. The so-called "Silicalite" crystalline silicate, when used in the practice of the present process, will tend to produce a relatively olefinic product, while a lower silica/alumina ratio ZSM-5-type zeolite will tend to form a relatively aromatic product, even though these materials have quite similar crystal structures. Preferred suitable crystalline solids are zeolites having a ZSM-5-type crystal structure. Zeolites in this category include, for example, in addition to ZSM-5 other such zeolites as ZSM-8 (see Netherlands Pat. publication No. 7,014,807 and U.S. Pat. No. 3,758,403), ZSM-11 (see U.S. Pat. Nos. 3,709,979 and 3,804,746), ZSM-35 (see U.S. Pat. Nos. 3,962,364, 3,965,210, 3,992,466 and 4,016,245). Also suitable are the zeolite NU-1 (see U.S. Pat. No. 4,061,724) and "Silicalite," a crystalline silicate discussed in Nature, Volume 271, page 512 (Feb. 9, 1978) (also see U.S. Pat. Nos. 4,061,724 and 4,073,865).

Another essential feature of the present invention is the use of a catalytically active metal having both a strong dehydrogenation activity and strong oxidation activity. Suitable active metals for use in carrying out the invention include platinum, palladium, iridium, rhodium, osmium, ruthenium and copper. Platinum is especially preferred in that it combines a strong dehydrogenation activity with a particularly strong oxidation activity. A combination of two or more of the above-noted active metals may also be employed, such as mixtures of platinum and palladium, platinum and iridium, platinum and rhodium, etc. In some cases, small amounts of other metals may have a promoting effect on the catalytic action of the primary active metal. In this regard, chromium, zinc, tin, germanium, rhenium and lead can be mentioned. Thus, contemplated for use in the invention are such combinations as platinum-tin, copper-chromium, platinum-rhenium and platinum-germanium. Promoting metals are preferably added to the primary active metal in amounts sufficient to provide 0.01 to 1 atomic ratio of the promoting metal per part of the active metal.

The active dehydrogenation-oxidation metal is disposed within the crystals of the 5.5–7.0 Angstrom crystalline solid component, i.e., the active metal is disposed in the interior of the crystals, as opposed to the external surface of the crystals. One skilled in the art will recognize that a minor proportion of the active metal will invariably be disposed on the external surface of the crystals when any practicable technique is used for disposing the active metal within the crystals. Thus, while it is desirable to have as little as possible of the active metal located on the external surface of the crystals, it is contemplated that, in many cases, some amount of active metal will unavoidably be located on the external crystal surfaces. Specification of the amount of the active metal in the catalyst refers solely to active metal located within the interior of crystals of the crystalline solid.

The active metal may be introduced into the interior of crystals of the crystalline solid in any convenient manner. In cases where a ion-exchangeable zeolitic crystalline aluminosilicate is used, cations including the active metal may be ion-exchanged into the zeolite crystal structure by well-known techniques. To provide concentrations in excess of exchange capacity, the active metal may be incorporated by other means such as impregnation. In cases where a crystalline silicate is used, the active metal can be impregnated into the interior of the silicate crystals while remaining essentially separate from the silicate crystal structure. Of the various impregnation techniques which can be used, those, such as the pore-fill method, which do not result in an overly high external surface concentration of the active metal on the crystals, are preferred. Combinations of techniques for incorporating the active metal into the interior of the crystals, such as both ion-exchange and impregnation, can also be employed to provide the desired amount of metal in the crystals.

The amount of active metal included within crystals of the crystalline solid is calculated on the basis of the entire particulate catalyst into which the active metal-containing crystalline solid is incorporated. In addition to the crystalline solid and the active metal, particles of the catalyst preferably also include a matrix or binder component. The catalyst particles may also include a second crystalline aluminosilicate component, e.g. an acidic, zeolite crystalline aluminosilicate having large-size pore openings and/or large-size cages. Such large-pore-size zeolites are particularly adapted for acidic catalysis of some cracking reactions. Materials suitable for use as a binder or matrix include, for example, porous inorganic oxides such as silica, alumina, magnesia, titania, natural or synthetic clays, silica-alumina and the like. Such inorganic oxide binders are well known to those skilled in the art. Conventionally, zeolite catalysts include crystals of the zeolite associated with the matrix, i.e., dispersed or imbedded in the matrix. This facilitates shaping of catalyst particles.

The amount of active metal included within the crystalline solid in the catalyst is from 0.01 to 1,000 parts per million, by weight, based on the total weight of the catalyst. Preferably, the amount of active metal within the interior of the crystalline solid component is between 0.01 and 100 parts per million, by weight of the catalyst. Preferably, in manufacturing the catalyst, the active metal-containing, intermediate-pore-size crystalline solid is mixed with the matrix or binder material, or a precursor thereof, and the mixture is then shaped, as by spray drying for use in fluidized systems, or by extrusion, pilling or the like for moving-bed systems. Generally, good results are obtained when the intermediate pore-size crystalline solid constitutes from 0.05 to 50 weight percent of the catalyst particles. Preferably, the catalyst particles contain about 0.25 to 25 weight percent of the intermediate-pore-size crystalline solid. If a large-pore-size zeolite is also included, it is preferably present in a concentration of 5-30 weight percent of the catalyst.

If the 5.5-7.0 Angstrom crystalline solid to be used in the catalyst possesses cationic ion-exchange properties, cations other than those of the active metal may optionally be exchanged in the crystal structure to replace the synthesis cations which are usually alkali metal cations. Preferred cations include, for example, known stabilizing cations such as rare earth metal cations, protons precursors such as ammonium, etc. If a large-pore or large-cage crystalline aluminosilicate, such as an X or Y type zeolite, is incorporated in the catalyst particles along with the smaller-pore 5.5-7.0 Angstrom zeolite, then cationic ion-exchange sites in the larger pore zeolite are preferably also occupied by conventionally used activating or stabilizing cations such as rare earths, protons or proton precursors.

The active metal-containing catalyst particles can be used advantageously in any of several optional modes in cracking systems. In one mode, a single catalyst composition can be used as the sole catalytic agent in the particulate solids inventory circulating in the cracking system. In such embodiments it is preferred that the catalyst composition include both the active metal-containing crystalline solid and also include a catalytically active, stable form of a larger-pore, acidic crystalline aluminosilicate component such as X or Y type zeolites.

In another optional mode of use, the active metal-containing catalyst can be circulated in a cracking system in physical mixture with other particulate solids. The other solids may be, for example, conventional zeolite-containing, particulate cracking catalysts, or non-zeolitic, crystalline or amorphous particulate cracking catalysts such as acidic silica-aluminum cogels, clays, etc. Other suitable particulate solids include alumina, or alumina-containing particles which can be used in a cracking system for sulfur oxides control in the catalyst regenerator, as disclosed in U.S. Pat. Nos. 4,071,436 and 4,115,249-251. Alumina may also serve as, or be incorporated within, a matrix or binder associated with the intermediate-pore-size, metal-promoted zeolite.

In any mode utilized to carry out the present process, the total concentration of the active metal located within the interior of the crystalline solid in circulation in the processing system is preferably maintained between 0.01 and 100 parts per million, by weight, calculated on the basis of the weight of the total circulating particulate solids inventory in the particular unit. Particularly preferably, the active metal is present at a concentration between 0.1 and 10 parts per million, by weight, based on the circulating particulate solids inventory. For example, when active metal-containing catalyst particles are used as the sole constituent of the inventory of circulating particulate solids, the concentration of the active metal within the 5.5-7.0 Angstrom crystalline solid in the catalyst itself is preferably between 0.01 and 100 parts per million, particularly preferred between 0.1 and 10 parts per million, based on the catalyst weight. When the active metal-containing catalyst is circulated (e.g. as an additive or co-catalyst) in physical admixture with other particulate solids, which may be, for example, conventional cracking catalyst particles or alumina particles, then the amount of active metal located within the crystals of the crystalline solid component and concentration of the active metal-containing particles in the system are preferably maintained at a level sufficient to provide a total concentration of active metal located in the interior of the 5.5-7.0 Angstrom crystalline solid, relative to the total particulate solids inventory, of 0.01 to 100 parts per million, particularly preferably 0.1 to 10 parts per million.

When burning coke off the active metal-containing crystalline solid in a cracking catalyst regenerator it is preferred to take full advantage of the presence of the oxidation-promoting active metal to achieve as complete oxidation as possible of coke and carbon monoxide. The completeness of coke combustion during catalyst regeneration can be characterized in terms of the concentration of coke on the regenerated catalyst. In the process of the invention, it is preferred to burn enough coke off the catalyst to provide a coke concentration of not more than 0.2 weight percent, and particularly preferably not more than 0.05 weight percent, on regenerated catalyst particles. The completeness of carbon monoxide combustion during regeneration can be characterized in terms of the ratio of concentrations, by volume, of carbon dioxide to carbon monoxide in the flue gas removed from a cracking catalyst regenerator. In the present process, it is preferred to catalyze sufficient combustion of carbon monoxide in the cracking catalyst regenerator, using the active metal, to provide a carbon dioxide/carbon monoxide volume ratio of at least 5 in flue gas removed from the regenerator. Particularly preferably, sufficient carbon monoxide is burned in the regenerator to provide a carbon dioxide/carbon monoxide ratio of at least 200 in the effluent gas.

In order to obtain the preferred relatively complete coke and carbon monoxide combustion, as indicated above, it is desirable to introduce molecular oxygen into the catalyst regenerator in an amount in excess of the stoichiometric combustion requirement for oxygen.

The amount of excess oxygen used in regeneration can be characterized in terms of the oxygen content of flue gas removed from the catalyst regenerator. In carrying out the present process, enough molecular oxygen is preferably introduced into the regenerator to provide an oxygen concentration of at least 0.3 volume percent in the gaseous effluent from the regenerator. The problem of carbon monoxide after-burning, often encountered when excess oxygen is used in conventional regeneration, is obviated in the process of the present invention by the presence in the regenerator of the active oxidation-promoting metal. Because of the oxidation-catalyzing activity of the metal, carbon monoxide can be burned rapidly in the presence of enough catalyst particles so that most of the heat of combustion of carbon monoxide can be absorbed in a relatively uniform manner into the catalyst particles with little or no flue gas temperature increase from further combustion downstream of the catalyst bed.

The active metal-containing catalyst particles can be used for plural steps of hydrocarbon conversion prior to regeneration. For example, the circulating catalyst can be contacted first with a first feed stream comprising relatively light hydrocarbons, e.g., naphtha and lighter, in which reforming-type reactions are particularly favored, then contacted with a second feed stream comprising relatively heavy hydrocarbons in which cracking reactions are favored, and finally regenerated. In a first conversion step, a light hydrocarbon feed could suitably include, for example, relatively low-octane hydrocarbons in the naphtha boiling range, such as n-pentane, n-hexane, n-heptane, etc., or relatively low-octane hydrocarbon fractions, such as straight-run naphtha. The products from a paraffins or naphtha upgrading step of this type may be combined with products from the cracking step or may be recovered separately. The products from a first conversion step of this type typically include naphtha-boiling-range olefins and aromatics, which have relatively high octane values.

Rather than carrying out plural serial conversion steps, one can perform two or more distinct conversion operations in parallel trains, with each operation using a portion of the active metal-containing catalyst. The portions of catalyst from each of the conversion trains can then be regenerated together combined in a single regeneration zone. For example, a heavy hydrocarbon feed suitable for cracking-type conversion can be processed in one riser-reactor train while a lighter feed suitable primarily for dehydrogenation and aromatization-type conversion is processed in a second riser-reactor, while using a common product-catalyst separation zone and a common catalyst regenerator.

In addition to cracking reactions, other suitable conversion reactions that can be carried out using the active metal-containing catalyst include dehydrogenation, polymerization, alkylation, cyclization, etc. The term "aromatization", as used herein, refers to reactions of aliphatic hydrocarbons to form hydrocarbons including a benzene ring. Examples include dehydrogenation of cyclohexane to form benzene, dehydrocyclization of n-heptane to form toluene, dehydrocyclodimerization of butanes to form xylenes, etc.

One advantage of using two or more serial conversion steps with a single circulating stream of catalyst is that one type of feed can more suitably be contacted with freshly regenerated, relatively hot catalyst, while another type of feed is preferably contacted with cooler, less active particles of the catalyst. Such staged conversion steps can be performed by serial processing in completely separate reactors or by introducing different feeds at different points in a single reactor, as, for example, at different levels of a single riser-reactor.

Other specific feeds beside light paraffinic and olefinic hydrocarbons or hydrocarbon fractions may also be beneficially treated in a separate conversion step, segregated wholly or partially from the primary catalytic cracking step. These include, for example, raffinates from aromatics extraction operations, high paraffin-content gas oils, slack waxes, foots oils, etc. In general, feeds suitable for conversion separately from the primary cracking feed are those which will benefit from contacting relatively hot catalyst in the absence of normal catalytic cracking feedstocks.

Particularly desirable products of the primary catalytic cracking process of the present invention include the products of paraffins dehydrogenation, such as $C_3$ to $C_8$ olefins, and particularly include alkylaromatics such as toluene, ethylbenzene, xylenes, etc. These dehydrogenation and aromatization products have octane ratings high enough to favorably influence the over-all octane of catalytically cracked naphtha.

The following Examples show the preparation and use of a catalyst according to the process of the present invention, along with a comparison to preparation and use of conventional cracking catalysts.

EXAMPLE 1

A comparison catalyst was first prepared to illustrate the effect of a typical FCC catalyst containing calcined rare earth Y-sieve with activity similar to catalysts manufactured commercially. Into a 5-gallon container stirred with a Cowles dissolver were added 29 lbs. of water, 900 g of gamma alumina, and 5 lbs. of an amorphous silica-alumina which had been calcined and ground to less than 15 microns average particle size. To this stirred mixture was added 325 ml. of concentrated nitric acid. The mixture was then heated to 130° F. and stirred for 45 minutes. After 45 minutes, 527 g of a calcined rare earth exchanged Y-zeolite obtained from the Union Carbide Corporation was added. The resulting mixture was spray-dried with an inlet temperature of 375° C. and an outlet temperature of 130° C. using a 2-fluid nozzle in a spray drier manufactured by Storke Bowen Engineering of Somerville, New Jersey. The finished catalyst had a water pore volume of 0.29 cc/g and a nitrogen surface area of 190 m²/g. This composition is hereinafter referred to as Catalyst A.

EXAMPLE 2

Example 2 shows the preparation of a second comparison catalyst containing RE Y-sieve and an H-ZSM zeolite. The H-ZSM zeolite of this catalyst has no active metal incorporated into its crystal structure. The second comparison catalyst was prepared in essentially an identical procedure as Catalyst A with the following single change: With addition of the calcined rare earth Y-zeolite, H-ZSM-type crystalline aluminosilicate was added in an amount sufficient to provide 2.5 weight percent of the finished catalyst. The finished catalyst was very similar in surface area and pore volume. This composition is hereinafter referred to as Catalyst B.

EXAMPLE 3

A third catalyst having the properties required for use in the process of the present invention was prepared in a manner identical to that used to prepare Catalyst B, except that, rather than using H-ZSM zeolite, a platinum-exchanged ZSM-type zeolite containing about 0.36 weight percent platinum was added in an amount sufficient to provide 2.5 weight percent Pt-ZSM zeolite in the finished catalyst. The catalyst contained 90 ppm of platinum as a finished catalyst. It was designated Catalyst C. The physical properties of Catalyst C were similar to those of Catalyst A and Catalyst B.

EXAMPLE 4

Catalyst A was tested for its catalytic cracking properties in a fluidized cyclic test unit. In this test, catalyst is contained in a vessel heated to 925° F.; the feedstock, a light East Texas gas oil (LETGO), is introduced into the bottom of the vessel. The total feed weight was one-fifth of the weight of the original catalyst charge. The products from the test are collected and analyzed after thoroughly stripping the spent catalyst with nitrogen. The spent catalyst is then regenerated with oxygen and the carbon dioxide collected and analyzed by known analytical methods. The cycle is then repeated four more times for a total of five cycles. The catalyst particles, prior to introduction into the unit, are heated for six hours at 1400° F. in an atmosphere of 100% steam. This steaming procedure gives the catalyst an activity similar to that found in equilibrium catalyst in a commercial FCC unit. Catalyst A, on an average of five cycles, gave 66.32 Vol. % 430° F.-conversion, 3.40 weight percent coke (based on fresh feed), and 0.10 weight percent hydrogen. Gasoline yield was 45.38 weight percent. The gasoline from Catalyst A had a research octane (clear) of 85.5 and a motor octane (clear) of 78.1. The gasoline showed the following analysis:

|  | Wt. % |
|---|---|
| Olefins | 7 |
| Aromatics | 32 |
| Paraffins and Naphthenes | 61 |

These results are essentially what would be expected by one skilled in the art and are typical of current commercial FCC catalysts.

EXAMPLE 5

Catalyst B was tested in the same manner as Catalyst A. In this test, Catalyst B gave 56.32 LV % conversion. A decrease compared to the example of Catalyst A. The coke was 2.70 weight percent, and the hydrogen was 0.13 weight percent of the feed. There was a slight increase in hydrogen compared to Catalyst A. The gasoline yield was 35.77 weight percent, based upon fresh feed. This gasoline had an octane of 85.6 research octane (clear) and a motor octane (clear) of 78.2. An analysis of the gasoline shows 14% olefins, 33% aromatics, and 53% paraffins and naphthenes. Catalyst B had a lower gasoline yield than Catalyst A but increased the gasoline octane, primarily through increasing the olefin content. This analysis is consistent with a substantial gain in research octane but minimal gain in motor octane, because olefins, as a class, have a higher research octane number than paraffins and naphthenes but a similar (to slightly greater) motor octane than paraffins and naphthenes. Thus, an increase in olefin content is manifested as an increase in research octane but not motor octane. Those skilled in the art will recognize that motor octane is better correlated with drivability than research octane. The decrease in $C_5+$ gasoline yield is typical of cracking results with catalysts containing a ZSM-type zeolite component.

EXAMPLE 6

This example concerns the use of Catalyst C, according to the present invention, for cracking a heavy hydrocarbon feed. When subjected to the same test conditions as described in Example 4, the yields obtained using Catalyst C were 60.98 LV % conversion, 3.22 weight percent coke, and 0.15 weight percent hydrogen. Gasoline yield was 37.53 weight percent. This yield of gasoline is surprising. The exchange of platinum into the ZSM resulted in an increase in gasoline yield compared to the ZSM-type catalyst, Catalyst B. This is an unexpected and highly favorable result obtained by including platinum in the ZSM-type zeolite. In addition, there is a slight increase in coke and hydrogen using Catalyst C, but this is considered a surprisingly small increase based on the teachings of the existing patent literature concerning the negative effects of adding platinum to cracking catalyst. An analysis of the gasoline obtained with Catalyst C shows 8% olefins, 38% aromatics, and 54% paraffins and naphthenes. The increase in aromatics which have, as a class, higher research octane and higher motor octane, would be expected to show a benefit in both research and motor octane of the gasoline. The measured research octane was 87.0, and the measured motor octane number was 78.8. This demonstrates that the exchange of platinum into the ZSM-type zeolite leads to a beneficial increase in gasoline octane primarily through the production of aromatics. This is to be contrasted gasoline made by Catalyst B in the test described in Example 5, where the increase in octane arose almost entirely from olefin production. It is concluded that the platinum is performing a beneficial function in carrying out the hydrocarbon conversion aspect of the present process, by increasing the gasoline yield compared to a catalyst containing H-ZSM-type sieve (Catalyst B). Catalyst C also gives a higher octane, both research octane and motor octane, than Catalyst B, which is itself better than Catalyst A, the conventional zeolite-type catalyst.

EXAMPLE 7

CO conversion activity for Catalysts A-C was determined for spent portions of catalyst after use in the tests discussed in Examples 4-6 by heating samples to 1250° F. in a one-inch diameter bed fluidized by an $N_2$/oxygen stream. Catalyst C was found to possess substantial $CO \rightarrow CO_2$ conversion activity.

The following illustrative embodiments describe preferred modes of carrying out the process of the present invention.

ILLUSTRATIVE EMBODIMENT I

Zeolite crystals are formed from an initial aqueous reaction mixture of ethylenediamine, sodium silicate solution, sodium aluminate, sodium chloride and hydrochloric acid. The initial reaction mixture has the composition 10.56 $ED_2O$:5.44 $NA_2O$:$AL_2O_3$:80 $SiO_2$:42 $H_2O$:83.9 NaCl based upon the mols of oxides. As used in this illustration, "$ED_2O$" represents the oxide of ethylenediamine. Sodium chloride and hydrochloric acid are used in the initial mix to maintain the proper pH and ionic strength levels. The resulting gel formed from the mixture is homogenized and allowed to age for approximately two months at an ambient temperature of approximately 25° C. After aging, the gel is maintained at a temperature of 150° C. in an autoclave for a period of 8 days. Zeolite crystals are filtered from the resulting solution at the end of the 8-day period, washed free of chloride ions and dried in a nitrogen atmosphere for 17 hours at 110° C. A powder X-ray diffraction analysis demonstrates the ZSM-type of pattern characteristic of Zeolite ZSM-5, as given in U.S. Pat. No. 3,702,886. The zeolite crystals are found to have uniform pore openings of about 6.5 Angstroms and uniform cages of about 6.5 Angstroms maximum diameter. Platinum is impregnated and ion-exchanged into the crystal structure of the zeolite crystals by contacting the zeolite crystals with an aqueous solution of a platinum compound containing platinum in a cationic form. The resulting active metal-containing zeolite crystals are then calcined and mixed with an aqueous silica-alumina hydrogel and with crystals of hydrogen-form Zeolite Y. The mixture contains, on a water-free basis, 2.5 weight percent of the platinum-containing ZSM-5 type zeolite, 15 weight percent calcined, rare earth-exchanged Y-type zeolite, 57.5 weight percent amorphous silica-alumina and 25 weight percent alumina. The mixture is then spray dried to form catalyst particles having particle diameters in the range of 50-100 microns. The catalyst particles thus formed contain 75 parts per million, by weight, of platinum, calculated as the element. Cracking tests are carried out in a conventional FCC unit using a combination of riser and bed-type cracking. For purposes of comparison, a conventional FCC catalyst containing 15 weight percent rare earth-exchanged Zeolite Y in a silica-alumina matrix is first used in the unit to establish baseline results. A 325°–525° C. boiling-range gas oil feed is employed. A cracking temperature of 500° C. and a catalyst/oil ratio of 7 are used. Spent catalyst passed to the regenerator contains 0.8 weight percent coke. The spent catalyst is regenerated at a temperature of 650° C. The carbon dioxide/carbon monoxide ratio in the flue gas from the catalyst regenerator is about 2, by volume, and the oxygen concentration in the flue gas is about 2 volume percent. The regenerated catalyst has a carbon concentration of about 0.08 weight percent. The Research Octane Number of the total naphtha product (24°–220° C.) is determined to be about 91. A total feed conversion of about 70 weight percent is obtained, with 15.0 weight percent of the products being $C_2$–$C_4$ olefins. Next, according to the present invention, the platinum-containing intermediate-pore-size zeolite catalyst is substituted for the conventional catalyst in the same FCC unit, utilizing the same feed and the same cracking conditions. The temperature in the catalyst regenerator is maintained at 677° C. The carbon dioxide/carbon monoxide volume ratio in the flue gas from the regenerator is found to be about 200, and sufficient excess oxygen is introduced into the regenerator so that the oxygen concentration in the flue gas is found to be about 2 volume percent. The amount of coke on the spent catalyst is about 0.9 weight percent, and the carbon concentration on the regenerated catalyst is found to be about 0.05 weight percent. The Research Octane Number of the total naphtha product is determined to be 93. A total conversion of about 67 weight percent is obtained utilizing the catalyst of the invention, with 18.0 weight percent of the product being $C_2$–$C_4$ olefins.

ILLUSTRATIVE EMBODIMENT II

Crystals of a zeolite are formed by the same procedure described in Illustrative Embodiment I. Anionic-form platinum is impregnated into the resulting zeolite crystals from an aqueous solution of chloroplatinic acid using the porefill method of impregnation. The active metal-containing zeolite crystals are then mixed with hydrolyzed clay and the resulting mixture is spray-dried to form particles of 50–100 microns diameter. The resulting particles contain 20 parts per million, by weight, of platinum, calculated as the element. Cracking tests are again carried out in the same conventional FCC unit and with the same feed and operating conditions as used in Illustrative Embodiment I. First the conventional RE-Y catalyst is employed alone, with the same conventional results as described in Embodiment I. According to the invention, 15 weight percent of the conventional RE-Y catalyst is then removed from circulation in the FCC unit and is replaced with an equal amount of the platinum-impregnated, intermediate-pore zeolite catalyst particles. The temperature in the catalyst regenerator is maintained at 677° C. The carbon dioxide/carbon monoxide volume ratio in the gas removed from the regenerator is found to be about 150 and sufficient excess oxygen is introduced into the regenerator so that the molecular oxygen concentration in the flue gas is found to be about 2 volume percent. The amount of coke on the spent catalyst is determined to be about 0.9 weight percent, and the carbon concentration on the regenerated catalyst is found to be about 0.08 weight percent. The Research Octane Number of the total naphtha product is determined to be 93. A total conversion of about 68 weight percent is obtained, with 16 weight percent of the product being $C_2$–$C_4$ olefins.

Preferred embodiments of the present invention having been described above, the broad scope of the invention and a variety of modifications, equivalents and variations of the invention will be apparent to those skilled in the art. The variations, modifications and equivalents are intended to be included within the scope of the appended claims.

What is claimed is:

1. A process for catalytically cracking feed hydrocarbons having normal boiling points above 220° C., comprising:
   (a) cycling between a reaction zone and catalyst regeneration zone a particulate solid catalyst comprising a zeolite crystalline silicate, and from 0.01 to 1,000 parts per million, by weight based on said catalyst, of an active metal or compound of an active metal selected from platinum, palladium, iridium, rhodium, osmium, ruthenium copper, and their mixtures calculated as the element, disposed within the interior of crystals of said crystalline silicate, the crystal structure of said crystalline silicate defining substantially uniform pore openings with maximum diameters of from 5.5 to 7.0 Angstrom units and substantially uniform cages with maximum cage dimension of from 5.5 to 7.0 Angstrom units, whereby contact between said feed hydrocarbons and said active metal is restricted;
   (b) forming cracked hydrocarbons having normal boiling points below 220° C. and depositing coke on said particulate solid catalyst by contacting said feed hydrocarbons with said catalyst in said reaction zone at cracking conditions including the absence of added molecular hydrogen, and forming olefins and aromatics by dehydrogenating and aromatizing aliphatic components of said feed hydrocarbons and said cracked hydrocarbons in said reaction zone in contact with said active metal in said crystalline silicate; and (c) forming carbon monoxide in said regeneration zone by burning coke from said catalyst with molecular oxygen at catalyst regeneration conditions, and burning said carbon monoxide with molecular oxygen in contact with said active metal in said crystalline silicate.

2. A process according to claim 1 wherein said active metal is platinum.

3. A process according to claim 1 further including the step of contacting at least a portion of said catalyst with at least one hydrocarbon having a normal boiling point below 220° C. after burning coke from said catalyst in said regeneration zone.

4. A process according to claim 1 wherein at least a portion of said active metal is introduced into the interior of said crystalline silicate by impregnation.

5. A process according to claim 1 wherein said crystalline silicate has a ZSM-5-type crystal structure.

6. A process according to claim 1 wherein sufficient carbon monoxide is burned in said catalyst regeneration zone to provide a carbon dioxide/carbon monoxide volume ratio of at least 5 in gases removed from said regeneration zone.

7. A process according to claim 1 wherein said catalyst contains from 2.5 to 25 weight percent of said crystalline silicate and further includes a porous inorganic oxide matrix.

8. A process according to claim 7 wherein said catalyst further includes a crystalline aluminosilicate selected from hydrogen-form Zeolite X or Zeolite Y or rare earth-form Zeolite X or Zeolite Y.

9. A process according to claim 1 wherein said catalyst is circulated between said reaction zone and said regeneration zone in physical admixture with a particulate solid including at least one component selected from alumina and zeolitic crystalline aluminosilicates having a faujasite crystal structure.

10. A process for catalytically cracking a hydrocarbon feedstock having normal boiling points above 220° C. comprising the steps of:

(a) contacting the feedstock in a reaction zone under cracking conditions in the absence of added molecular hydrogen with a catalyst comprising a zeolitic crystalline silicate having substantially uniform pore openings with a maximum diameter of from 5.5 to 7.0 Angstroms and substantially uniform cages with a maximum cage dimension of from 5.5 to 7.0 Angstroms, said aluminosilicate having disposed within its internal pore structure from 0.01 to 1,000 ppm calculated as the elements by weight based on said catalyst of an active metal or compound thereof selected from the group consisting of platinum, palladium, iridium, rhodium, osmium, ruthenium, copper and their mixtures; and (b) regenerating the catalyst by contacting the catalyst with molecular oxygen under regeneration conditions in a regeneration zone.

11. A process for catalytically cracking feed hydrocarbons having normal boiling points above 220° C., comprising:

(a) cycling between a reaction zone and catalyst regeneration zone a particulate solid catalyst comprising a zeolitic crystalline aluminosilicate and from 0.01 to 1,000 parts per million, by weight based on said catalyst, of an active metal or compound of an active metal selected from platinum, palladium, iridium, rhodium, osmium, ruthenium and copper, calculated as the element, disposed within the interior of crystals of said crystalline aluminosilicate, the crystal structure of said crystalline aluminosilicate defining substantially uniform pore openings with maximum diameters of from 5.5 to 7.0 Angstrom units and substantially uniform cages with maximum cage dimension of from 5.5 to 7.0 Angstrom units, whereby contact between said feed hydrocarbons and said active metal is restricted;

(b) forming cracked hydrocarbons having normal boiling points below 220° C. and depositing coke on said particulate solid catalyst by contacting said feed hydrocarbons with said catalyst in said reaction zone at cracking conditions including the absence of added molecular hydrogen, and forming olefins and aromatics by dehydrogenating and aromatizing aliphatic components of said feed hydrocarbons and said cracked hydrocarbons in said reaction zone in contact with said active metal in said crystalline aluminosilicate; and (c) forming carbon monoxide in said regeneration zone by burning coke from said catalyst with molecular oxygen at catalyst regeneration conditions, and burning said carbon monoxide with molecular oxygen in contact with said active metal in said crystalline aluminosilicate.

12. A process according to claim 11 wherein said active metal is platinum.

13. A process according to claim 11, wherein the crystalline aluminosilicate has a ZSM-5 type crystal structure.

14. A process for catalytically cracking a hydrogen feedstock having normal boiling points above 220° C. comprising the steps of:

(a) contacting the feedstock in a reaction zone under cracking conditions in the absence of added molecular hydrogen with a catalyst comprising a zeolitic crystalline aluminosilicate having substantially uniform pore openings with a maximum diameter of from 5.5 to 7.0 Angstroms and substantially uniform cages with a maximum cage dimension of from 5.5 to 7.0 Angstroms, said aluminosilicate having disposed within its internal pore structure from 0.01 to 1,000 ppm calculated as the elements by weight based on said catalyst of an active metal or compound thereof selected from the group consisting of platinum, palladium, iridium, rhodium, osmium, ruthenium, copper and their mixtures; and (b) regenerating the catalyst by contacting the catalyst with molecular oxygen under regeneration conditions in a regeneration zone.

* * * * *